United States Patent [19]
Guicheteau et al.

[11] 3,979,654
[45] Sept. 7, 1976

[54] PROCESS CONTROL SYSTEM USING A TWO WIRE REMOTE CONTROL SYSTEM

[75] Inventors: Eugene H. Guicheteau, Audubon; Justin O. Johnson, Jr., Levittown, both of Pa.

[73] Assignee: Honeywell Inc., Minneapolis, Minn.

[22] Filed: May 13, 1974

[21] Appl. No.: 469,339

[52] U.S. Cl. .............................. 318/599; 318/624; 318/678
[51] Int. Cl.² ........................................ G05B 11/28
[58] Field of Search ........... 318/678, 674, 673, 640, 318/624, 609, 610, 599; 323/21

[56] References Cited
UNITED STATES PATENTS

| | | | |
|---|---|---|---|
| 3,483,455 | 12/1969 | Klysa et al. | 318/599 X |
| 3,487,458 | 12/1969 | Martens et al. | 318/599 |
| 3,652,912 | 3/1972 | Bordonavo | 318/599 |
| 3,686,557 | 8/1972 | Futomura | 318/672 X |
| 3,766,409 | 10/1973 | Shuey | 323/21 UX |

*Primary Examiner*—Robert K. Schaefer
*Assistant Examiner*—John L. Feldhaus
*Attorney, Agent, or Firm*—Laurence J. Marhoefer; Lockwood D. Burton

[57] ABSTRACT

A process control system including a control station responds to the departure of a process variable from a set point to provide a direct current signal in a two-wire transmission line in a direction dependent upon the direction of such departure and time-proportioned in accordance with the magnitude of the departure. A solid state power relay that accepts the d-c signal at a single pair of input terminals includes high-current rating triacs that are adapted selectively to be fired by triggering pulses generated in response to the d-c signals alternating current power from a source of alternating current to a heavy-duty motorized valve for operation of the latter in one direction or the other and at a speed in accordance with the signals.

20 Claims, 7 Drawing Figures

PROCESS CONTROL SYSTEM USING A TWO WIRE REMOTE CONTROL SYSTEM

BACKGROUND OF THE INVENTION

1. Field of the Invention

This invention relates to controllers for industrial processes and particularly to the type of controller that provides so-called proportional speed floating control. The invention is particularly concerned with an electronic controller that is operative in response to signals representative of a process condition to produce a bi-directional low level direct current (d-c) output that may be utilized to regulate the direction and speed of operation of an electric motor valve actuator for a final control element, without valve position feedback, to maintain an industrial process at a desired value. The controller is particularly suitable for controlling industrial processes having short time constants.

2. Description of the Prior Art

Proportional speed floating control is a type of control action in which the direction and rate of adjustment of the final control element, such as a valve, damper, etc., is proportional to the direction and extent of deviation, from a desired set point, of the process variable that is being controlled. The final control element is said to "float" since the position of adjustment can be anywhere within the operating range when the deviation is zero.

Proportional speed floating controllers accept low level direct current voltage or current input signals from primary sensors responsive to process variables to provide, for example, rate of flow control, by means of motor driven valves, of water, sewage, sludge, slurry, and other process fluids. Such controllers compare the signal from the flow or other process variable transmitter with a set point signal representing a desired flow rate, which set point signal may be either locally or remotely generated. When a difference appears between the actual and the desired process variable value, the controller provides output signals that control the supply of energizing current to a reversible electrical motor for rotation at a speed and in a direction to operate a control valve as required to restore the process variable to the desired value. The basic control mode is proportional velocity. That is to say, the output signals of the controller are speed signals that are proportional to deviation. These speed signals are integrated by the electrical motor as the latter drives to the correct valve position.

Controllers of this type may be employed to directly control the operation of a light-duty motorized valve having, for example, a rating of one ampere or less. In modern industrial process control systems, however, heavy-duty motorized valves having much higher power requirements are common. In order to enable such controllers to control the operation of such heavy-duty motorized valves, a power relay is employed therewith to control the required heavy current and or high voltage to the motorized valve. Power relays utilizing semi-conductor switches of the type normally referred to as an SCR, triac or thyristor have been employed because of their heavy current and high voltage handling capabilities. Such power relays are generally mounted adjacent the motorized valve at a location remote from the controller, with the controller output signals being transmitted to the power relay over a plurality of relatively high voltage transmission circuits.

The control of such remotely located power relays by electronic controllers has had certain drawbacks that have added substantially to the cost of achieving acceptable performance and reliability. These drawbacks have resulted from the fact that measuring low-level voltages and currents in circuits that are not referenced to the same potential can be rather difficult. A primary reason for such difficulty is that both the controller and power relay must be grounded, and when remotely located from each other one is grounded at one location and the other is grounded at another location which may be at a different potential than the ground at the first location. Another factor that has contributed to increased costs and decreased performance and reliability is the difficulty in transmitting without phase shift and signal degeneration, that is, at a one-to-one time rate, the output signals from the controller to the relay. This difficulty has been due to the effects of capacitance and inductance in the transmission circuits connecting the controller to the power relay.

SUMMARY OF THE INVENTION

Among the objects of the present invention is the provision of an improved industrial process control system embodying a two-wire low energy level transmission line for transmitting direction and magnitude signals from a proportional speed controller to a remotely located power relay for manipulation of a final control element, without position feedback, to maintain an industrial process at a desired value.

A further object of the invention is to provide an improved electronic industrial process control system wherein a proportional speed floating controller and a remotely located power relay may be maintained at different reference potentials without adverse effect on the operation of the system.

A further object of the invention is to provide an industrial process control system in which a remotely located power relay is completely isolated from the measuring and controlling circuit and the signal transmission circuit.

Still another object of the invention is to provide an industrial process control system in which a proportional speed floating controller and a remotely located power relay are electrically isolated by optical means from each other.

Another object of the invention is to provide an improved electronic industrial process control system in which signals from a proportional speed floating controller to a remotely located power relay are transmitted by a two-wire low level, low energy, transmission line, and wherein no electromagnetic radiation nor radio frequency energy that may be generated in the controller is transmitted to the power relay or vice versa.

Another object of the invention is to provide an industrial process control system in which the transmission of the direction and magnitude signals from a proportional speed floating controller to a remotely located power relay are transmitted at a one-to-one time rate.

Still another object of the invention is to provide an improved industrial process control system in which stray electromagnetic signals that may be induced on the transmission line are ineffective to produce a control or other action on the power relay operation.

Still another object of the invention is to provide an improved industrial process control system wherein the possibility of a transmission line fault in producing an undesired response by the power relay is substantially eliminated or minimized.

A further object of the invention is to provide in such an improved industrial process control system means to signal an open transmission line condition.

In accomplishing these and other objects there has been provided in accordance with the present invention improvements in a proportional speed floating controller and in transmission line circuitry for transmitting control signals from said controller to a remotely located power relay, which power relay is electrically isolated from said controller. The improved controller comprises a deviation amplifier to compare process variable and set point signals and to provide an output signal related to the magnitude and polarity of the difference. The output signal is applied to a derivative or rate network to provide an error signal of the same polarity but of a magnitude representative of the deviation between the process variable and set point signals, with a rate component added. This error signal is algebraically compared by a modulator with a periodic sawtooth wave form signal that is produced by a sawtooth generator. The comparison results in repetitive time-proportioned pulses each of duration dependent upon the magnitude of said error signal, but having a minimum duration of 8 milliseconds. Such time-proportioned pulses are converted by a unique polarity responsive controller output switching circuit into a bi-directional time-proportioned direct current (d-c) flow in a two-wire low voltage and current transmission circuit, the direction of such current flow being in accordance with the polarity of said error signal. By the use of logic circuitry one such pulse only is allowed to be produced within each cycle of the sawtooth wave of the sawtooth generator. The bi-directional time-proportioned d-c is conducted by the transmission line to a remotely located power relay. At the power relay a pair of optical isolators are provided and arranged to be selectively activated depending upon the direction of flow of the received d-c pulses. The optical isolators serve to electrically isolate the power relay from the transmission line and the controller. The power relay includes means responsive to the actuation of the optical isolators to provide appropriate signals to a triac or other motor control circuit thereby to energize a reversible valve motor actuator for operation in one direction or the other. The duty cycle of such energization is in accord with the time-proportioning of the current pulses transmitted from the controller and received over the two wire transmission line by the said optical isolators.

BRIEF DESCRIPTION OF THE DRAWINGS

A better understanding of the present invention may be had from the following detailed description when read in connection with the accompanying drawings wherein.

DETAILED DESCRIPTION OF THE EMBODIMENTS

Figure 1:
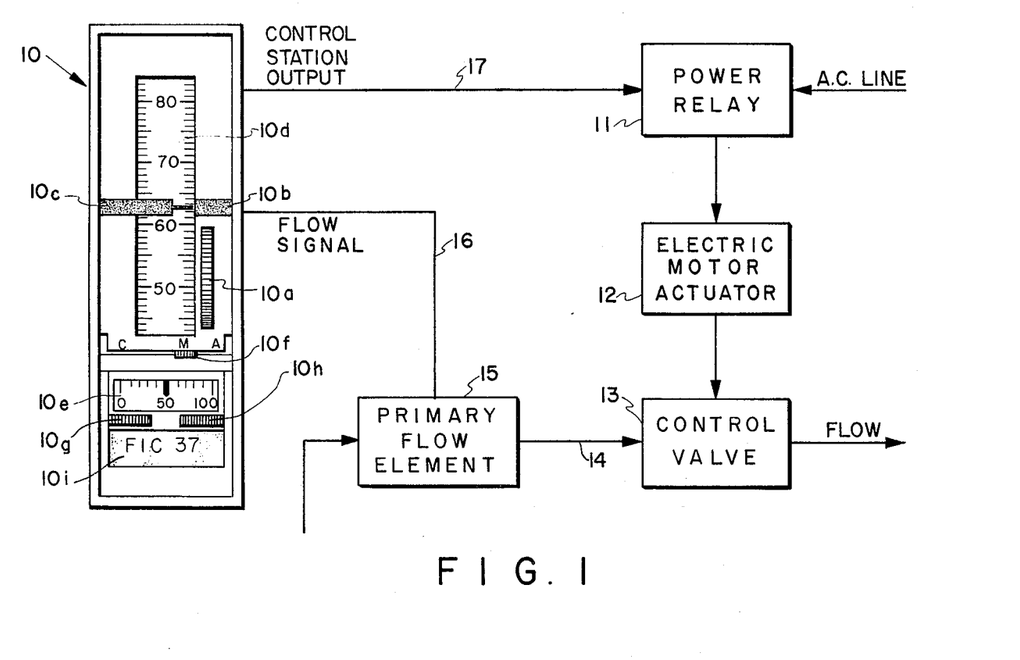
FIG. 1 is a simplified block diagram showing a process control system, a rate of flow control loop, including an electronic controller and a remotely located power relay arranged to control a motorized valve that may be a heavy-duty type and comprises the final control element of the process control system.

In FIG. 1 there is illustrated in simplifed block form a proportional speed floating controller. The controller includes a deviation indicating control station generally designated by numeral 10 and a solid state power relay designated by the numeral 11. Analog signal values representing process variable (PV) and desired set point (SP) are applied to station 10. A reversible electrical motor 12 is arranged to be energized by the power relay 11 to drive a final control element or valve damper, etc. 13 which regulates a process, shown as the flow of fluid through a controlled flow line 14.

Figure 4:
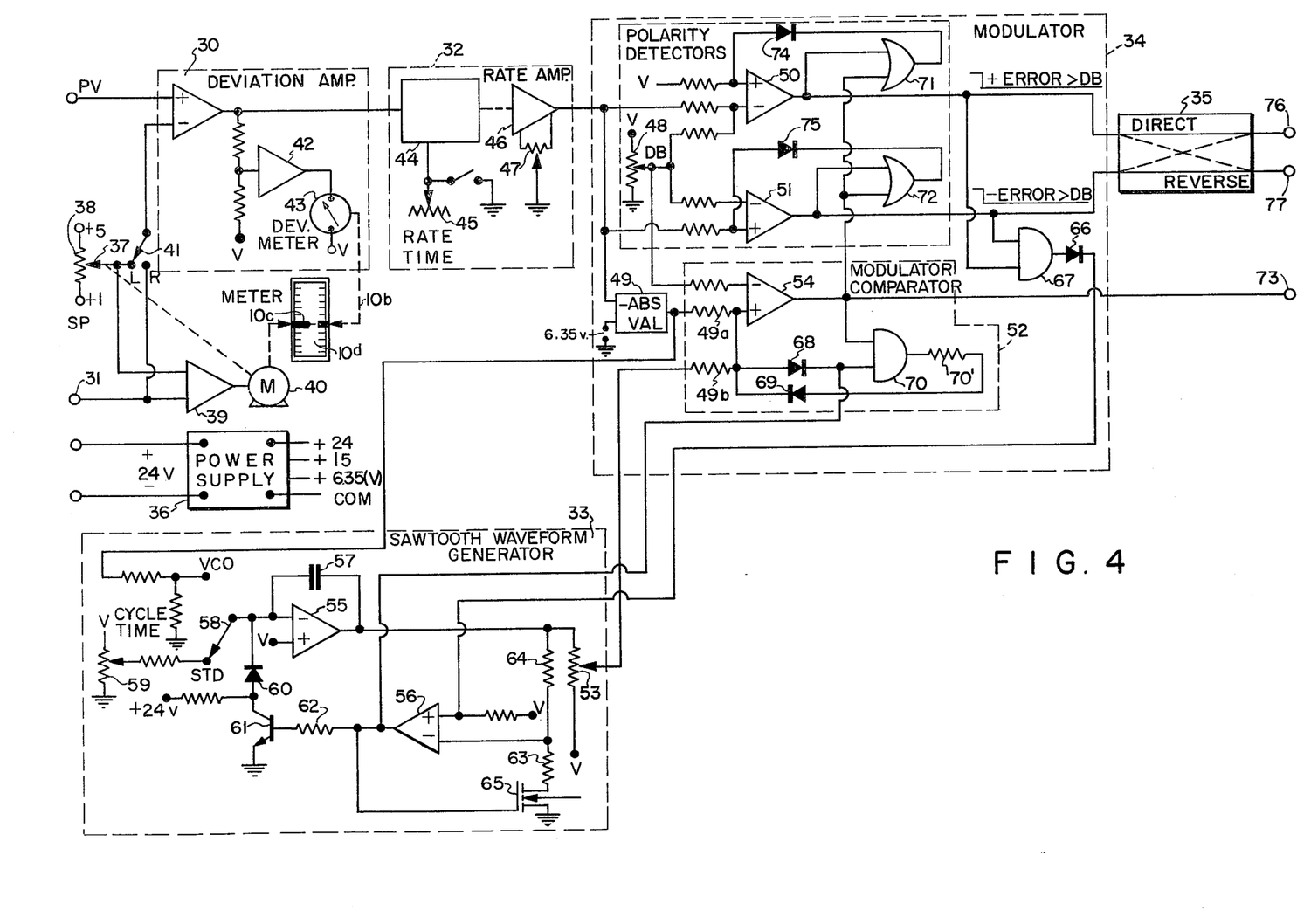
FIG. 4 is a schematic diagram of an input portion of the electronic controller of the system illustrated in FIGS. 1 and 2.

The process variable signal to the control station 10 is derived by means of a transducer 15 which is connected to control station 10 by a transmission line 16. The set point signal (SP) may be manually determined as by manipulation of a set point adjustment thumbwheel 10a. Movement of thumbwheel 10a positions a contact along a slide wire, not shown in FIG. 1. Alternatively, the set point signal may be established at a remote point as illustrated in FIG. 4.

Typically the process controlled may comprise a flow of water, sewage, sludge, slurry or other liquid through line 14. Transducer 15 maay comprise a flow transmitter which senses the rate of flow of such liquid and develops the analog process variable signal PV that is applied to the control station 10. The control station 10, as illustrated, is provided with indicators 10b, and 10c and a scale 10d to display the value of the process variable and the set point value, respectively. A meter 10e is provided to display the valve opening as effected by the operation of the reversible electrical motor 12 when a separate transmitting circuit for the purpose is provided. That is to say, the meter 10e can be made to display the percent valve opening in response to an external slidewire, not shown, operated by the valve. The control station 10 is also provided with a control transfer switch lever 10f and manual control push buttons 10g and 10h. Control transfer switch lever 10f has three positions to which it may be adjusted. Lever 10f is moved to position "A" for automatic control and position "M" for manual control of the process. For computer control, lever 10f is moved to position "C". A controller status light 10i is provided to indicate whether the output of the control station is under control of the computer or the controller. The status light 10i is behind a translucent front bezel of the control station.

The control station 10 senses the departure or deviation of the process variable PV from the set point SP and produces a nominal 10 ma d-c time-proportioned current pulse in one direction in the line 17 when the departure of the process variable PV from the set point SP is in one direction and produces a 10 ma d-c time-proportioned current pulse in the opposite direction in the line 17 when the departure of the process variable is in the opposite direction.

The d-c time-proportioned current signal appearing at the output of control station 10 is transmitted by the transmission line 17 to power relay 11, wherein it is sensed by one or the other of a pair of photo-isolators, depending upon its polarity, as is explained in detail hereinafter with reference to FIG. 7. Thus, upon the appearance of a signal at the input of power relay 11, the power relay is activated to establish an alternating current energizing circuit for the reversible motor 12 for rotation in one direction or the other depending upon the polarity of said signal. The speed at which the reversible motor rotates is in accordance with the time-proportioning of the said signal. The rotation of the motor and consequent adjustment of valve 13 restores the process 14 to the condition at which the process variable and set point signals are in accord.

The basic control mode, as noted hereinbefore, is proportional velocity. Thus the output of the power relay 11 in addition to being a direction signal, is a speed signal that is proportional to the deviation of PV from SP, which signal is integrated by the electrical motor 12 as the latter drives to the correct valve position. The time-proportioned pulse signals from control station 10 determines motor speed by duty cycle while their direction of flow determines the direction of motor rotation.

Figure 2:
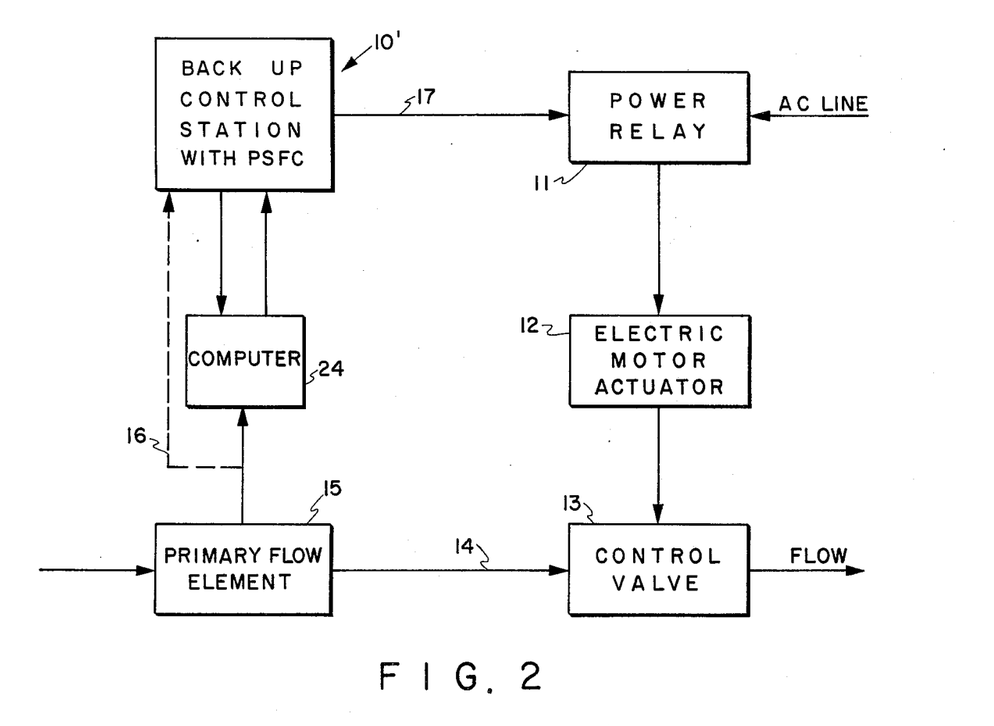
FIG. 2 is a simplified block diagram showing an electronic controller and power relay, as in FIG. 1, arranged in conjunction with a direct digital control (DDC) computer in a rate of flow control system.
Figure 3:
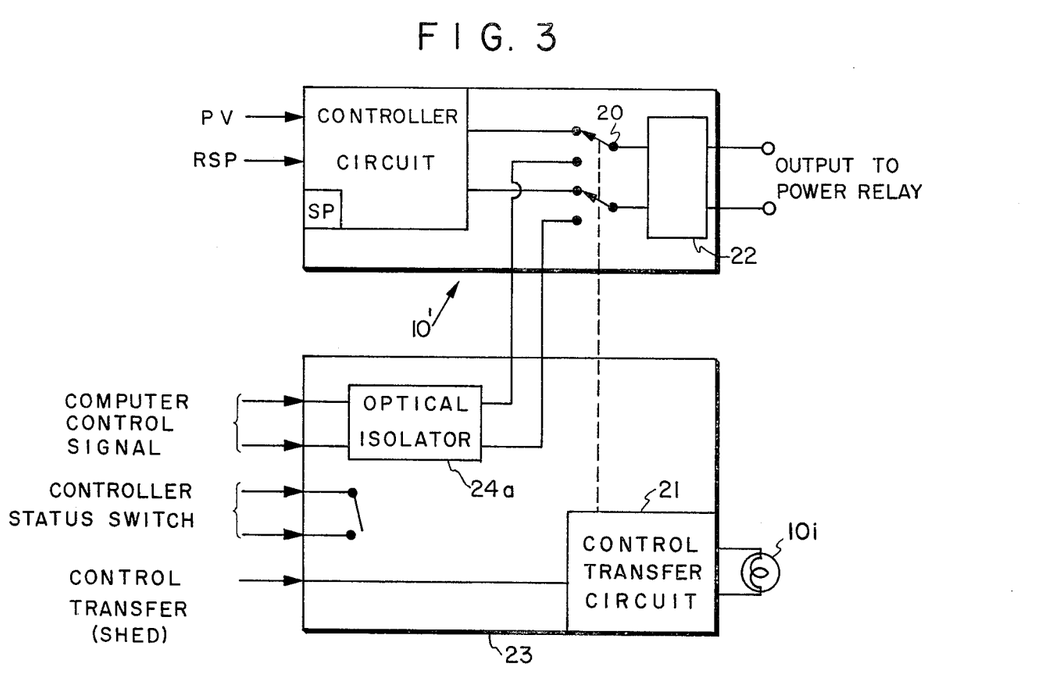
FIG. 3 is a block diagram illustrating the computer-backup control interface of the system shown in FIG. 2.

FIGS. 2 and 3 illustrate the basic control station of FIG. 1 modified to allow it to be employed as a backup controller in a DDC computer installation. The control station in FIGS. 2 and 3 is designated by numeral 10'. In one mode of operation of the arrangement of FIG. 2, the controller mode, the flow rate in controlled flow line 14 is controlled by comparing the flow signal PV from the transducer 15 to set point SP and proportioning the speed and direction of reversible motor 12 through the power relay 11. The arrangement of FIG. 2, however, also provides for operation in a computer mode wherein a computer 24 directly provides time-proportioned signals to an output section of the control station 10', as described hereinafter by reference to FIG. 5.

Referring to FIG. 3 it is noted that when transfer switch lever 10f of FIG. 1 is adjusted to computer position a transfer switch 20 is actuated by a control transfer circuit 21 to provide the output drive circuit 22 of the control station 10' with bi-directional d-c signals through a circuit directly from the computer 24. This circuit includes a computer adapter card 23 having an optical isolator 24a, to provide signals at the output of control station 10', which signals represent the velocity and direction of motion required of the valve actuator motor to maintain the process variable under control. Thus, with switch 20 in computer position, the computer directly controls the output of station 10' and thereby motor 12 and valve 13. With the switch 20 in controller position, the control station 10' controls the output and the motor 12 and valve 13. The controller status light 10i, as previously noted, is provided to indicate whether the output of the station 10' is under control of the computer or controller. For example, light 10i may be illuminated when the output is not under computer control.

Figure 5:
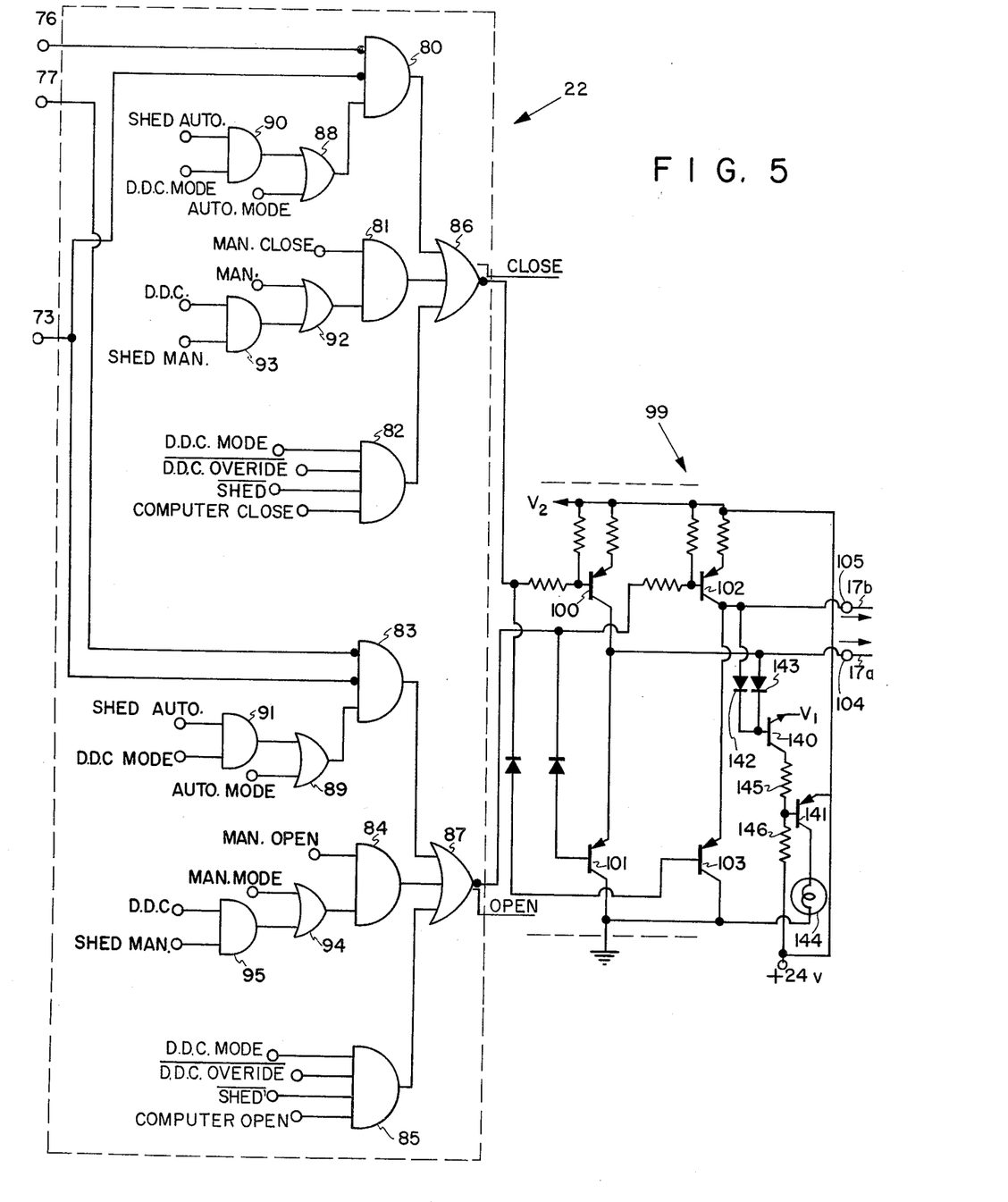
FIG. 5 is a schematic diagram of an output portion of the said electronic controller of FIGS. 1 and 2.

FIGS. 4 and 5 collectively show in simplified form the circuitry of the control station 10. The portion of the circuitry shown in FIG. 4, includes a deviation amplifier 30, a set point generator, a rate amplifier 32, a sawtooth waveform generator 33, a modulator 34, a direct/reverse switch 35, and a power supply 36. The set point generator includes an input terminal 31 for receiving a remotely-set set point signal.

As shown in FIG. 4 the process variable and set point signals are applied to the input terminals of the deviation amplifier 30. The SP signal is obtained from the adjustment of a contact 37 along a slide wire 38. That adjustment may be manual, as previously noted, or, may be effected automatically in response to a signal received at terminal 31 from a remote point. For such remote-set operation a servo motor amplifier 39 and reversible motor 40 are provided to effect the automatic adjustment of the set point slide wire 38 in response to the remote set point adjustment. Such adjustments are indicated by the position of the indicator 10c along the scale 10d.

A single pole-double throw switch 41 is provided whereby in one position, the signal from the set point slide wire 38 is applied to the input of amplifier 30, and in the other position, the remote set point signal is applied directly to the input of the amplifier 30. With the latter connection, the servo amplifier 39 and motor 40 continue to operate to adjust the slide wire, thereby tracking the remote set point adjustment.

An amplifier 42 and a meter 43 are provided in association with deviation amplifier 30 to indicate the deviation of the process variable signal from the desired set point. Meter 43 adjusts indicator 10b along scale 10d to indicate the magnitude of the process variable. Amplifier 42 serves to buffer meter 43 from the output of the deviation amplifier 30. Amplifier 42 also scales the deviation amplifier output. Optional alarm loads not shown may be associated with the meter 43.

The output of deviation amplifier 30 is also connected to the input of the rate amplifier 32 which, as shown includes a derivative network 44. The derivative network of the rate amplifier can be bypassed by a switch. The derivative network provides, for example, a rate time adjustment from 0.4 to 60 seconds. This time depends upon the setting of a rate time adjustment potentiometer on slide wire 45. The signal at the output of the rate amplifier 32 comprises the deviation signal with a derivative component added.

The output signal from the derivative network is applied through a buffer amplifier 46, in an inverse manner, to each of the input circuits of a pair of polarity detectors which are included in modulator 34 and are indicated at 50 and 51. The buffer amplifier 46 provides signal gain and impedance buffering. An offset adjustment 47 is part of the buffer amplifier and is provided to permit zero output of rate amplifier 32 notwithstanding electronic offset.

A signal device from the tap on an adjustable potentiometer slide wire indicated at 48 is applied to a common terminal of the input circuits of the polarity detectors 50 and 51. The signal from slidewire 48 provides a dead band zone, sometimes referred to as a neutral zone, in which some limited deviation between the process variable and set point signals can occur before a command is given by controller 10 to the power relay 11 for a control action.

The output signal voltage of the rate amplifier 32 is applied also to an amplifier 49. The amplifier 49 is so-called absolute value amplifier and is characterized in having a one-to-one gain and in translating both positive and negative signal voltages at its input as a negative voltage at its output. The output of amplifier 49 is connected by a resistor 49a to a positive input terminal of an amplifier 54 included in a modulator comparator indicated at 52. If desired, the output of amplifier 49 can be characterized to provide a positive output regardless of the input. With such modification apppropriate circuit alterations would be required as understood by those skilled in the art.

A saw tooth voltage is also applied to said positive input terminal amplifier 54 as seen in FIG. 4 from the saw tooth generator 33 through a circuit including a gain adjustment slidewire 53 and a fixed resistor 49b. The dead band signal voltage from slidewire 48 is connected to the negative input terminal of the amplifier 54. As shown, the modulator comparator 52 also includes diodes 68 and 69, and AND gate 70, and resistor 70'.

The sawtooth wave generator 33 includes a ramp generator 55 and a ramp comparator 56. A reference voltage V derived from power supply 36 is applied to the positive input terminal of generator 55. A capacitor 57 is connected between the negative input terminal of said generator and the output terminal thereof; additionally, gain adjustment slidewire 53 is connected in the output circuit thereof. A single pole-double throw switch 58 is provided for selectively connecting the said negative input terminal of generator 55 to the tap on an adjustable potentiometer or slidewire 59, when in a first position, and to the output of the absolute value amplifier 49, when in a second position.

With switch 58 in the STD (standard) position, the negative terminal of generator 55 is connected to the contact on the slidewire 59. With the switch 58 in the VCO (voltage controlled oscillator) position, the negative terminal of amplifier 55 is connected to the output terminal of the absolute value amplifier 49. For each switch position there is circuitry to be considered contributing to both the rising portion as well as the falling portion of the saw tooth wave. The circuit contributing the rising portion of the sawtooth wave, for the STD position includes a reverse biased diode 60. This diode isolates the 24 volt terminal of the power supply 36 and also a transistor 61 from the negative terminal of amplifier 55. During the rising portion of the sawtooth wave, the transistor 61 conducts. During the falling portion of the sawtooth wave, the transistor 61 is turned off, that is, it is not conducting. The diode 60 then is effective to apply a current to the negative terminal of amplifier 55 and capacitor 57 from the 24 volt power source terminal. This current flows into the capacitor 57 whereby the voltage at the output terminal of generator 55 decreases. During the rising portion of the sawtooth wave, the current flow is in the reverse direction, that is, from capacitor 57 to the slidewire 59. As a result the output voltage of the generator 55 then gradually increases.

Included in the sawtooth generator 33 also are resistors 63 and 64 and a field effect transistor (FET) 65. The latter components are connected with the source terminal of the FET 65 connected to ground and the drain terminal connected through resistors 62 and 63 to the output of generator 55, and the gate terminal connected to the output of ramp comparator 56. The junction of resistors 63 and 64 is connected to the negative input terminal of ramp comparator 56. The positive input terminal of the latter is connected to reference voltage V and also, through a diode 66 to the output terminal of an AND gate 67 in the modulator 34. The output of ramp comparator 56 is connected through a diode 68 to the positive input terminal of modulator comparator amplifier 54. The output of comparator 56 is also connected to the gate of FET 65.

With this arrangement, in the generation of each sawtooth wave, the upward portion of each wave is provided by the slidewire 59 or the absolute value amplifier 49 depending upon the position of switch 58. When the said upward portion is provided by the amplifier 49, the time for each upward sweep of the wave is variable in accordance with the magnitude of the error signal. When said upward wave portion is provided by the slidewire 59, the time for each upward sweep is determined, over the range of variation, by the position of the tap along the slidewire. The downward portion of each sawtooth signal wave is determined by the diode 60 and the transistor 61. That is to say, the time for each downward sweep is fixed at a predetermined value depending upon the parameters of the circuit including the capacitor 57, the diode 60 and transistor 61.

A complete cycle of each sawtooth wave produced by generator 33 includes an upward portion and a downward portion. The time required for each such complete cycle may be adjusted manually by manipulation of the tap along slidewire 59, or determined automatically in accordance with the magnitude of the error signal, and hence, in accordance with the variation of the process variable from the desired set point.

The sawtooth wave form generator 33 thus produces a periodic sawtooth wave form the cycle time or frequency of which is determined either by the manual adjustment of the slidewire 59 or automatically in accordance with the error signal, that is the magnitude plus rate component of the deviation signal minus the dead band signal, at the output of the absolute value amplifier 49. The amplitude of the sawtooth wave form is determined by the setting of the gain control slide wire 53. This sawtooth wave form acts as a reference signal to determine the proper output duty cycle of the controller. To this end, the sawtooth generator output is algebraically compared by the modulator comparator 52 with the error signal. The modulator comparator 52 provides an output pulse whenever the reference sawtooth wave is smaller, in amplitude than said error signal. The greater the error signal the longer the duration in each cycle of such pulse from modulator comparator 52, that is the larger the duty cycle. This duty cycle is expressed in terms of the percentage of time on of the pulse to the complete time of one cycle.

Normally, the sawtooth generator 33 is inoperative. The arrangement is such, however, the sawtooth generator is triggered into operation whenever the error signal at the output of the rate amplifier 32 exceeds the dead band, and is turned off when that error signal returns to within the dead band. To this end, in the operation of the sawtooth generator 33, the ramp generator 55 normally is held off by a clamp on the non-inverting or positive input terminal of the ramp comparator 56. This clamp is provided by the AND gate 67, which causes the output of ramp generator 55 to ramp upward to a saturated output level. This clamp is removed for a predetermined minimum time of 8 m sec. when an error signal greater than the dead band appears at the output of rate amplifier 32.

The modulator 34, as seen in FIG. 4, includes an AND gate 70 having one input terminal connected by a diode 68 to the positive input terminal of the amplifier 54, and the other input terminal connected to the output of amplifier 54. The output of the AND gate 70 is connected by a series connected resistance 70' and a diode 69 to the positive input terminal of the amplifier 54. The modulator 34 also includes a pair of OR gates 71 and 72 which are associated, respectively, with the output circuits of the polarity detectors 50 and 51. Thus, one input terminal of each of the OR gates 71 and 72 is connected to the output of its associated polarity detector 50 and 51, respectively, and each of the other input terminals is connected to the output of the modulator comparator 52 and to one output terminal 73 of the portion of the control station 10 illustrated in FIG. 4. The output terminal of OR gate 71 is connected to the positive input terminal of polarity detector 50 by a diode 74. The output of OR gate 72 is connected by a diode 75 to the positive input terminal of polarity detector 51.

With this arrangement, the error signal at the output of the rate amplifier 32 is processed by the modulator 34 to determine the controller output duty cycle and the direction of output current, based upon the direction of the error signal and the controller gain and dead band settings. Specifically, the polarity detectors 50 and 51 algebraically combine the dead band and error signals. One polarity detector, for example, detector 50 combines the error and dead band signals and emits an active signal, indicated by a low voltage output, when a positive error signal is sensed, resulting from the process variable signal being greater than the setpoint signal and the difference being in excess of the dead band setting. The other detector 51 combines the same two signals but emits an active signal, indicated by a low voltage output, when a negative error signal is sensed, resulting when the process variable is less than the set point signal and again the difference being in excess of of the dead band.

The outputs of the polarity detectors 50 and 51 are connected by the Direct/Reverse Switch 35 to a pair of terminals 76 and 77. Switch 35 is provided to permit selective interchange of the two signal directions at terminals 76 and 77 for valve close/open operation. In the full line position shown, the output of the polarity detector 50 is connected to the terminal 76 and the output of detector 51 is connected to the terminal 77. The dotted line position shows the said two output circuits interchanged, wherein the output of detector 50 is connected to terminal 77 and the output of detector 51 is connected to terminal 76.

It is noted that the sawtooth wave output of the sawtooth generator 33, as it appears at the slider 53, rides on a bias voltage which in a typical embodiment of the invention may be 6.35 volts above ground. A similar bias voltage is provided between the upper input terminal of the absolute value amplifier 49 and ground whereby the signal voltage at the output of amplifier 49 lies between the value of the bias voltage and ground and approaches the latter as the deviation signal on its input increases from zero in either direction. The voltage V across the slidewire resistor 48 desirably also has a similar value.

Figure 6:
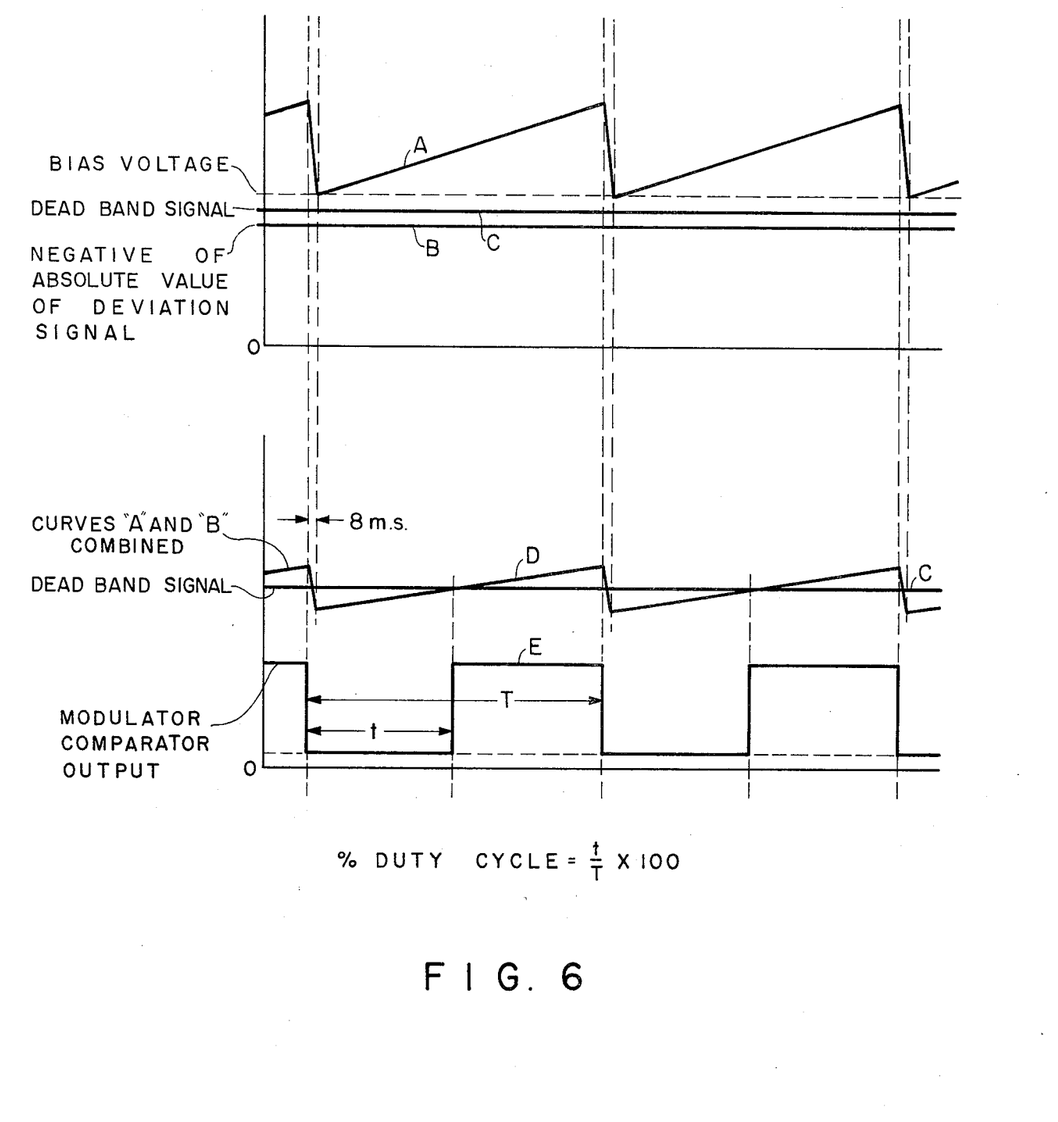
FIG. 6 illustrates voltage wave forms generated by the controller of FIG. 4.

By reference to FIG. 6 it will be seen that the modulator 34 generates an output signal voltage or pulse that is time-proportioned to the deviation signal magnitude and gain control setting. The input signal to the upper terminal of the modulator comparator 52 comprises the algebraic sum of two signals represented respectively by curves A and B. The curve A is a sawtooth wave of a signal taken from the tap on slidewire 53. The curve B represents the signal appearing at the output of the absolute value amplifier 49. The input to the negative input terminal of amplifier 54 is represented in FIG. 6 by the curve C. This is the dead band signal derived from the slidewire 48. The curve D in FIG. 6 is a representation of the algebraic sum of the curves A and B and is shown being compared with the dead band signal represented by the curve C.

With these input signals applied to the modulator 34, the latter produces an output signal that is represented by the curve E in FIG. 6. Curve E, as shown, is a square wave, and has a low value whenever the curve D has a negative slope or is below the value represented by the dead band curve C. Conversely, the curve E has a high value whenever the curve D is above the value represented by the curve C and has a positive slope.

Upon variation in the magnitude of the deviation signal, there is a corresponding change in the proportion of the time that the curve E has a low value compared to the time that it has a high value. The ratio of the time that the curve E has a low value to the total time of each cycle is referred to as the "duty cycle." Thus, the duty cycle is variable in accordance with the magnitude of the deviation signal from the circuit 32. It will be apparent that the minimum time in which the curve E has a low value is the time required for the sawtooth voltage of curve A to drop from its maximum to its minimum value. This also is the minimum duty cycle achievable with the apparatus of FIG. 4. In a typical embodiment of the invention, this minimum time may well be 8 msec., as hereinbefore noted.

The frequency of the sawtooth wave A, and thereby of the square wave E, is determined by the setting of the cycle time adjustment slidewire 59 and may be varied over a range of 20 cycles per second to 0.002 cycles per second. Thus, the range of variation of the period of each cycle is from 0.05 seconds to 50 seconds.

When the controller is in the automatic mode of operation, a controller output signal will occur whenever the outputs of one of the polarity detectors 50 or 51 and the output of the modulator comparator 52 both are low. In order to minimize the effect of noise on the deviation signal in causing output drive signals when the deviation is within the deadband, logic is incorporated within the modulator 34 to permit one and only one output pulse to occur within one cycle of the sawtooth generator. This prevents a train of pulses at noise frequency from appearing at the controller output. This is accomplished by holding the polarity detector on whenever the output of modulator comparator 52 is low, and clamping the modulator comparator off following the expiration of low modulator comparator output during the remainder of a cycle of the wave produced by the sawtooth generator. The clamp is removed at the beginning of the next generator cycle.

A desirable characteristic of the controller is the provision for a minimum output signal duration of approximately 8 milliseconds (msec.), the approximate time of one-half wave of a 60 cycle alternating current supply. The power relay to which the controller is connected has 60 cycle, zero-crossing voltage detection circuitry which assures that the valve motor will not be actuated unless the output drive signal is coincident with the zero voltage crossing point of the power line. Without the minimum of 8 msec pulse duration, the controller settings could be such that a small error would result in a very short (much less than 8 msec)

periodic output pulse which might take considerable time to coincide with the power line zero voltage point. For this reason, when the minimum output pulse width is made to be 8 msec, the probability is great that the first controller output pulse will trigger the power relay into action to reduce the deviation of the process variable signal from the set point. The ramp comparator output of sawtooth waveform generator is a two-state signal. It is in the low state for approximately 8 msec when the sawtooth waveform is on its downward excursion and is in the high state for the remainder of a cycle period when the sawtooth is on its upward ramp. When the ramp comparator 56 is in the low state, its output clamps the non-inverting terminal of the modulator amplifier 54 low, forcing its output to the active (low) state. The appropriate polarity detector 50 or 51 is automatically clamped in the active state by the individually associated OR gate 71 or 72 when the output of the modulator comparator 52 is low. The minimum width of any output pulse is therefore approximately 8 msec. This minimum width of output pulse is desirable when the alternating current supply source is 60 cycles. When the alternating current supply source for motor 12 is a frequency other than 60 cycles, the minimum output pulse duration preferably corresponds to the time of one-half wave of such source, for example, 10 msec with a 50 cycle source.

There is shown in FIG. 5 the computer interface and output circuit portion of the control station 10 illustrated in block form in FIGS. 1 and 2. This output portion includes AND gates 80, 81, 82, 83, 84 and 85 and OR gates 86 and 87.

In the operation of the apparatus, the output signals from the polarity detectors 50 and 51 and from the modulator 34 drives the gates 80 and 83. Specifically, depending upon the polarity of the error signal at the output of rate amplifier 32, one or the other of the polarity detectors 50 and 51, because of their inverse or reverse input connections, will be in a low state and apply a low output voltage by way of an associated terminal 76 or 77 to one input terminal of an individually associated AND gate 80 or 83. This relationship, as previously noted, may be reversed by operation of the Direct/Reverse Switch 35. Such low voltage applied to a first input terminal of an associated gate 80 or 83 will continue as long as the error is in the same direction and is greater than the dead band value. The time-proportioned low voltage signal then appearing at the output 73 of the modulator 34 is applied to a second input terminal of each of said gates 80 and 83, but will be effective to open only that one of the gates 80 or 83 that then also has a low voltage applied to its first input terminal. This action occurs, however, only if high voltage then also appears on a third input terminal of each of said gates 80 and 83, as is further explained hereinafter. The time that a gate 80 or 83 is so held in an open state is in accord with the time modulations or proportioning action of the modulator 34.

As seen in FIG. 5, the third input terminal of each of the gates 80 and 83 is connected to the output of individually associated OR gates 88 and 89. One input terminal of the OR gate 88 is connected to the output of an AND gate 90. Similarly, one input terminal to OR gate 89 is connected to the output of an AND gate 91. The other input terminal of each of the OR gates 88 and 89 is connected to an "AUTO MODE" terminal. One input of each of the AND gates 90 and 91 is connected to a "DDC MODE" terminal, and the other input of each of said AND gates is connected to a "SHED-AUTO" terminal.

One input to each of AND gates 81 and 84 is a "manual" signal, the signal in the case of AND gate 81 being a "MANUAL CLOSE" signal and the signal in the case of AND gate 84 being a "MANUAL OPEN" signal. The other input terminal of each of said AND gates 81 and 84 is derived from an OR gate and an AND gate. Thus, the second input to AND gate 81 is derived from the output of and OR gate 92, a first input to which is a "MANUAL-MODE" signal and the second input to which is the output of an AND gate 93. Similarly, the second input signal for AND gate 84 is derived from the output of an OR gate 94. A first input for the OR gate 94 is a MANUAL MODE signal and the second input is derived from the output of an AND gate 95. Each of the AND gates 93 and 95 have two input signals, one being DDC MODE and the other input being SHED MANUAL.

The AND gates 82 and 85 each have four inputs three of which are respectively DDC MODE, "DDC OVERRIDE" and "SHED." The fourth input to AND gate 82 is "COMPUTER CLOSE," and the fourth input to AND gate 85 is "COMPUTER OPEN."

As shown in FIG. 5, the outputs of AND gates 80, 81, and 82 are connected to an individually associated input of OR gate 86. Similarly, the outputs of AND gates 83, 84 and 85 are connected to an individually associated input of OR gate 87. The arrangement is such that upon the application of a signal to any one of the three inputs of each of the OR gates 86 and 87, the gates will be in an open state. Opening of gate 86, for example, will produce a control effect resulting in a time-proportioned d-c pulse in one direction in transmission line 17a, 17b and consequently in operation of the electric motor actuator 12, as seen in FIG. 1 for operation in one direction, for example, for closing the control valve 13. Similarly, the opening of the OR gate 87 will result in a d-c pulse in the opposite direction in line 17a, 17b and in energization of the electric motor actuator for operation in the opposite direction. This direction of actuation of the electric motor actuator may be reversed, as previously noted, by manipulation of the DIRECT/REVERSE SWITCH 35.

With the apparatus in the "AUTOMATIC MODE" the time that the gate 86 or 87 is so held in an open state is in accord with the time modulations or proportioning action of the modulator 34, and in accord with the deviation of the process variable signal from the desired set point.

The output circuits of OR gates 86 and 87 are connected respectively to the input circuit of a bi-directional constant current source control transistor pairs indicated at 99 and control transistor pairs 100, 101, and 102, 103 whereby upon deviation of the process variable signal in one direction and actuation, for example, of gate 86 to an open state, transistor 100 is rendered conductive. A current pulse is then transmitted to an output terminal 104 of the control station 10. This current is transmitted over line 17a to the remotely located power relay 11 through an optical isolator 121, as illustrated in FIG. 7, and then transmitted back over wire 17b to a terminal 105 of control station 10. The current pulse is then conducted by transistor 103 to ground. When the deviation of the process variable signal is in the opposite direction, a current pulse is transmitted through transistor 102 to the control station output terminal 105, then over wire 17b to the power relay 11 and through a second optical isolator 122, back over wire 17a to the control station output terminal 104, and through the transistor 101 to ground. This current signal in each case may have a nominal value of 10 milliamperes, with the voltage between the terminals 104 and 105 of the control station 10 floating between the source voltage and ground. The current pulse signals through the transmission line 17a and 17b are time-proportioned bidirectional d-c pulses. The transmission line, as noted, is a low-voltage, low current line. The control station output circuitry illustrated in FIG. 5 comprises a computer interface and error polarity responsive output switch. Thus, there is combined in the output switch circuitry, information from the control transfer switch lever 10f, as seen in FIG. 1, the modulator 34, as seen in FIG. 4, and the computer interface circuitry as seen in FIG. 2 and 3. This circuitry controls the bidirectional current source 99 in accordance with the polarity and amplitude of the error signal and establishes the appropriate duty cycle that should be transmitted. The operation of this circuit is further explained by the following description.

The output switch 86, for example, will transmit a signal to the power relay 11 for that energization of motor 12 required to effect a valve closure, under the following three conditions:

1. The control transfer switch-lever 10f is in AUTOMATIC COMPUTER SHED to automatic in DDC MODES, and
  a. The positive error polarity detector 51, for example, is activated, and
  b. The output of modulator comparator 52 produces a pulse calling for drive.
2. Mode switch in MANUAL or COMPUTER SHED to manual in DDC MODES, and
  a. A manual close switch 10g, for example, as seen in FIG. 1, is depressed.
3. Mode switch in DDC mode, and
  a. DDC OVERRIDE not active,
  b. COMPUTER SHED not active,
  c. Computer transmits a valve close signal.

The output switch 87, for example, will transmit a valve open signal under the following three conditions.

1. Mode switch in AUTOMATIC or in DDC with COMPUTER SHED to automatic, and
  a. The negative error detector, polarity detector 50, for example, is activated, and
  b. The output of modulator comparator 52 produces a pulse calling for drive.
2. Mode switch in MANUAL or in DDC with COMPUTER SHED to manual, and
  a. A manual open switch, for example, switch 10, FIG. 1, is depressed.
3. Mode switch in DDC MODE, and
  a. DDC OVERRIDE not active; and
  b. COMPUTER SHED not active; and
  c. Computer transmits a valve open signal.

Figure 7:
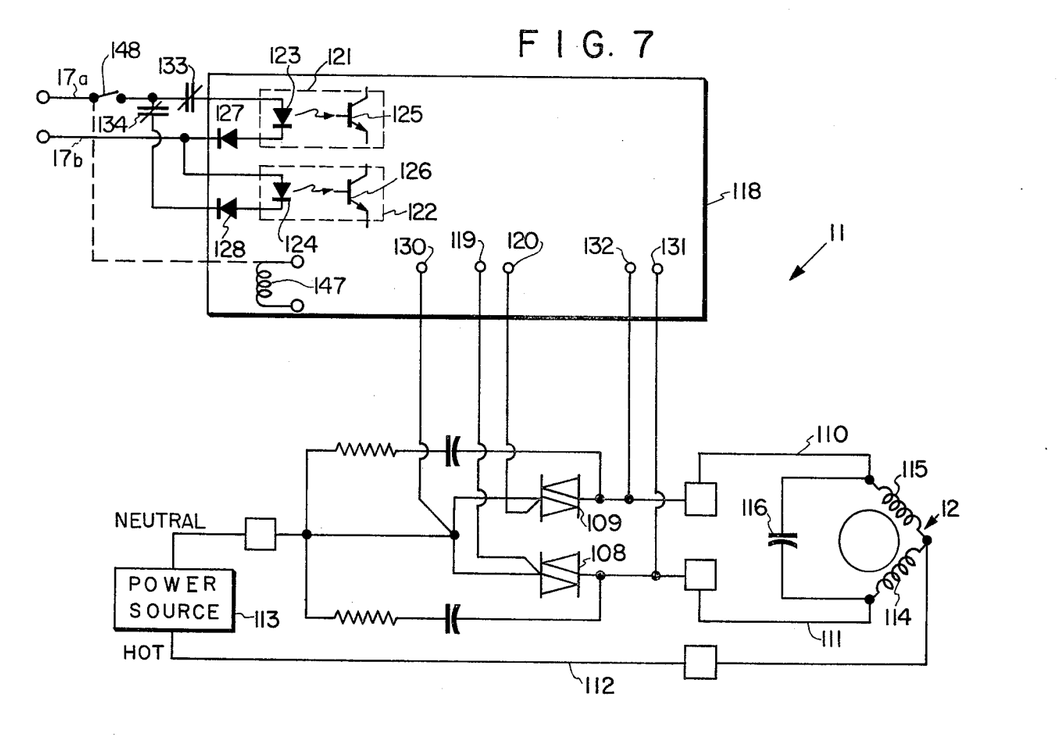
FIG. 7 is a diagram, in block and schematic form, showing a typical form which the power relay and electric motor actuator of FIGS. 1 and 2 may take to effect the desired control of the process control system.

The power relay 11 as shown in the block and schematic diagram of FIG. 7, includes a pair of semi-conductor switches, for example, triacs, 108 and 109. Each of the triacs includes a pair of principal electrodes, and a control or gate electrode. Triacs 108 and 109 may be high-current rating triacs, for example, RCA types 40927. The triacs 108 and 109 are connected by lines 110, 111 and 112, respectively, in circuit with motor 12 and an alternating current source of power indicated at 113. The principal electrodes of triac 108 are connected between a first terminal of power source 113 and a first terminal of a first winding 114 of motor 12. The principal electrodes of triac 109 are connected between said first terminal of source 113 and the first terminal of a second winding 115 of motor 12. A capacitor 116 is connected between said first terminals of said winding 114 and 115. Both of the other terminals of said motor windings are connected together and by line 112 to the second terminal of source 113. Lines 111, 112, and 113 may be heavy-duty power lines that are capable of carrying with little or no loss the heavy currents that may be drawn by the motor 12 from source 113.

With this arrangement, when triac 108, for example, is rendered conductive by proper actuation of its gate circuit, alternating current flows directly through motor winding 114 and in series with capacitor 116 and winding 115 to establish a rotating field in the motor 12 that produces rotation in one direction. When triac 109 is rendered conductive, the capacitor is placed in series with motor winding 114 and a rotating field is established that produces motor rotation in the opposite direction.

Triacs 108 and 109 are selectively fired by triggering pulses that are adapted to be applied to their respective gate electrodes by an electronic control section indicated in block form at 118. Typically, the power relay including the electronic control section 118, shown in FIG. 7, is of the type disclosed in detail and claimed in the copending application of Homer L. Greer bearing Ser. No. 469,345 and filed on even date herewith. As in the power relay disclosed in said Greer application, the arrangement is such that gating voltage pulses can be produced at gating terminals 119 and 120 of the control section 118 only each zero cross-over of the alternating voltage across the principal electrodes of the triacs 108 and 109. To this end, means are provided for sensing conditions of zero voltage and current across each of the triacs. These means include a connection from the common junction of the triacs 108 and 109 to an input terminal 130, and individual connections from the other terminals of the triacs to respective input terminals 131 and 132, of the control section 118.

The control section 118 is arranged selectively in response to the time-proportioned direct current pulses in transmission line 17a and 17b, to produce gating pulses for the triacs 108 and 109 at gating terminals 119 and 120. Such triggering pulses are produced as a result of the selective acutation of optical isolators 121 and 122 by the current in the transmission line. Specifically, with d-c pulses in one direction in transmission line 17a, 17b, optical isolator 121, for example, responds to activate circuitry in control section 118 to produce a gating pulse at terminal 119 to fire triac 108, thereby to energize motor 12 to rotation of one direction.

With d-c pulses in the transmission line 17a, 17b in the opposite direction, the optical isolator 122 similarly responds whereby a gating pulse is produced at terminal 120 to fire triac 109. Such gating pulses can occur, as noted, only at the time of a zero cross over of the alternating voltage across the principal electrodes of the triac that is to be fired. The control section 118 also preferably includes provisions, as illustrated and described in said Greer application, for inhibiting operation of the gating circuit in response to demands from the control station 10 for reversing direction of the rotation of the motor 12, which commands occur too rapidly for the triacs 108 and 109 properly to respond without tending to cause damage to them. Such inhibiting provisions desirably also include means to delay the response of the triacs 108 and 109 to the commands received from the control station 10 whereby to avoid further firing of them when their response is not in accord with the commands.

The gating pulses at the output terminals 119 and 120 of the electronic control section 118 desirably have a time duration of approximately ½ millisecond, a time sufficiently long to insure that the triac is above the minimum switching current for the triac. Accordingly, in the apparatus shown in FIG. 7, the motor 12 is supplied by source 113 with periodic or intermittent pulses of alternating current power. The periodicity of these pulses is determined by the time-proportioning of the low voltage-low current signal in the transmission line 17a, 17b, and hence, by the frequency of the sawtooth wave produced by the generator 33. These power pulses, moreover, are modulated in time duration as a function of the deviation in the process variable signal from the set point. In other words, the motor energization or duty cycle is varied as a function of time. As the process variable deviation increases the motor duty cycle increases, that is, alternating current power pulses are supplied to the motor for a longer time, and vice versa. The direction of motor rotation is determined by which one of the triacs 108 or 109 is activated to produce the said power pulses.

The optical isolators, as seen in FIG. 7, are light-operated switches and may be of the type known commercially as the Monsanto MCT 26 photo transistor opto-isolator. Each of the optical isolators 121 and 122 includes a light emitting diode (LED) indicated at 123 and 124, respectively, and individually associated photo transistors respectively designated 125 and 126. The light emitting diodes 123 and 124 are each connected to receive the time-proportioned current signals transmitted from the control station 10 over the transmission line 17a, 17b. The arrangement is such that with current flow in one direction only one of the LED's 123 or 124 emits light to activate its associated photo transistor 125 or 126. Specifically, with the output terminal 104 of the control station positive with respect to terminal 105, and hence current flow over transmission line 17a in the direction toward the power relay 11, LED 123 emits light to activate its associated photo transistor 125. With the polarity at the control station output terminals 104 and 105 reversed, and hence, current flow over the transmission 17a and 17b in the opposite direction, LED 124 emits light to illuminate and thereby activate the photo transistor 126. Diodes 127 and 128 individual respectively to LED's 123 and 124 are protective devices to protect the optical isolators 121 and 122 against damage that might result because of the application of reverse voltage to the LED's 123 and 124. Such reverse voltage can occur upon the opening, for example, of limits switches 133 and 134 that, in an industrial application, normally are provided to prevent further valve adjustment when the latter has reached its extremes of travel. Thus, limit switch 133 has been provided to open and hence preclude further opening valve adjustment, and limit switch 133 has been provided to open and preclude further closing valve adjustment.

Referring to FIG. 5 there is further provided, in accordance with the present invention, a circuit for signalling an open circuit condition of the transmission line 17a, 17b. Such open circuit condition, as noted, occurs when the final valve under adjustment has reached its extremes of travel. Open circuit conditions may also be established, as further described herein, if a fault should occur in the power relay or motor energizing circuit. In addition, open circuit conditions may result because of damage to the transmission line 17a, 17b which usually in the application of the apparatus, would pass through an industrial environment, and hence, possibly be subject to damage and open circuit.

Accordingly, there is provided, shown in FIG. 5, a circuit that will respond to an open transmission line condition to actuate an alarm lamp or other annunciator to call the attention of an operator to the open transmission line condition. This circuit includes a pair of transistors 140 and 141, a pair of diodes 142 and 143 and an alarm lamp indicator 144. Diodes 142 and 143 are connected in back-to-back relationship across the control station output terminals 104 and 105. The junction of the cathodes of the diodes is connected to the base of transistor 140, the collector of which is connected by resistor 145 and 146 to +24 VDC. A reference voltage $V_1$ is applied to the emitter of transistor 140. The junction of the resistor 145 and 146 is connected to the base of transistor 141. The collector emitter circuit of transistor 141 includes a connection from the 24 volt to the emitter and the collector of transistor 141 and the alarm device 144 to ground.

With this circuit arrangement, the voltage $V_1$ applied to the emitter of transistor 140 is so selected that normally transistors 140 and 141 are not conducting. Upon an open circuit condition developing in the transmission line 17a, 17b, the voltage of terminal 104 or 105 will rise depending upon the direction of the command signal, which rise in voltage will be sensed to render transistor 140 conductive. This renders transistor 141 conductive which permits current flow from the voltage source through the alarm device 144 for actuation of the latter. Alarm current will be pulsed simultaneously with the pulsing current at the output terminals 104 and 105 of the control station 10. If a semiconductor device such as SCR is employed in lieu of the transistor 141, the alarm may be made to be continuous until the device is reset by momentary interruption of the SCR current.

As noted, if desired the alarm circuit disclosed in FIG. 5 may also be made to respond to failure conditions that may occur in the power relay 11, the motor 12, or the triac actuating circuit therefore. Thus, if a fault should occur in the power relay or motor energizing circuit, such condition could be made to cause a relay 147, as seen in FIG. 7, to open a normally closed contact 148 connected in series with the wire 17a of the transmission line, in the power relay. Such opening of the transmission line will result in actuation of the alarm 144 at the control station in the same manner as previously described upon an open circuit condition occurring in the transmission line 17a, 17b.

Thus, there has been provided in accordance with the present invention an improved industrial proces control system including a two-wire low energy level transmission line for transmitting direction and speed signals from a proportional speed controller to a remotely located and electrically isolated power relay for the regulation of a final valve operator, without position feedback, for maintaining an industrial process at value, which system features signalling means at the controller indicating that the final valve operator has been adjusted to one or the other of its extreme positions, the occurrence of a fault in the power relay and-/or the valve operator energized thereby, or an open circuit condition of the transmission line.

Subject matter disclosed but not claimed in this application is disclosed and claimed in the copending application bearing Ser. No. 469,345, filed on even date herewith by Homer L. Greer.

The embodiments of the invention in which an exclusive property or privilege is claimed are defined as follows:

1. In a process control system having means to produce a signal that is variable in accordance with changes in a process and provided with a control means that is operative in a sense and to an extent for adjustment of said process to bring said process-variable signal into accord with a set point signal, the rate of said adjustment varying in accordance with the extent of deviation of said process variable and set point signals, a circuit comprising, a controller remote from said control means for comparing said process-variable and set point signals to produce at a pair of output terminals a d-c time-proportioned signal of one polarity when said process variable signal is less than said set point signal and of the opposite polarity when said process variable signal is greater than said set point signal, duration of said d-c signal being variable in accordance with the extent of deviation of said process-variable from set point signals, a power relay located adjacent said control means and operative selectively to control said control means for actuation to effect adjustment of said process in one direction or the other, said power relay having a pair of reversely connected optical isolators, each having a light emitting element and an individually associated light sensitive element adapted to be illuminated thereby when the associated light emitting element is energized, said control means including means responsive to the selective illumination of said light sensitive elements to produce a first trigger signal output in response to illumination of one of said light sensitive elements and a second trigger signal output in response to illumination of the other of the light sensitive elements, first and second semi-conductor switch means, means selectively to apply said first trigger signal to the gate of one of said semi-conductor switch means and the second trigger signal to the gate of the other semi-conductor switch means, means connecting said semi-conductor switch means and said control means to a source of electrical power for energization in a first sense when said first semi-conductor switch means is fired and for energization in the opposite sense when said second one of said semi-conductor switch means is fired, and a two-wire transmission line connecting the said controller and said power-relay for applying said time-proportioned signals to said optical isolators, whereby said d-c time-proportioned signals selectively energize the light emitting element of one or the other said optical isolators depending upon their polarity.

2. A proportional speed floating controller adapted in response to a process-variable signal to produce bidirectional time-proportioned direct current signal pulses and operative to control the direction and speed of operation of a reversible motor coupled to a final control element that governs the process comprising, a deviation amplifier responsive to the departure of said process-variable signal from a set point to produce an error signal the magnitude and polarity of which depends upon the extent and direction of departure of said process-variable signal from said set point, a sawtooth wave generator operative to produce a sawtooth wave signal having an adjustable frequency, a modulator having first, second, and third output terminals and operatively arranged to compare said error and sawtooth signals and responsive to the polarity of said error signal to produce a pulse at said first terminal when said error signal is of one polarity and a pulse at said second terminal when said error signal is of the opposite polarity, said modulator producing at said third terminal a signal the duration of which varies in accordance with the relative magnitudes of said error and sawtooth signals, an output circuit including means connected to said terminals of said modulator to produce bidirectional direct current pulses the direction and time duration of which vary in accordance with the polarity and amplitude of said error signal, a two-wire transmission line including a pair of reversely connected light emitting diodes, means connecting said output circuit to said transmission line, and a control circuit including light sensitive means responsive to light emitted by said light emitting diodes to effect intermittent energization of said reversible motor for rotation in a direction determined by which of said diodes is energized by said direct current pulses in said transmission line, the energization and thereby the speed of said motor being in accordance with the time-proportioning of said direct current pulses.

3. A proportioning speed floating controller as specified in claim 2 including manual means to adjust the frequency of the sawtooth voltage produced by said sawtooth voltage generator.

4. A proportioning speed floating controller as specified in claim 2 including means operative to adjust the frequency of said sawtooth voltage produced by said sawtooth voltage generator in accordance with the amplitude of said error signal.

5. A proportional speed floating controller as specified in claim 2 including alarm means to indicate an open circuit condition of said two-wire circuit, said alarm means comprising means to compare the voltage between said wires to a reference voltage, said comparison means being operative in response to an increase in voltage across said two-wire circuit upon an open circuit condition of the latter to close an energizing circuit to said alarm.

6. A proportioning speed floating controller as specified in claim 2 wherein said modulator includes an absolute value amplifier and a modulator comparator, and wherein said error signal is applied to the input of said absolute value amplifier, the output of said absolute value amplifier is connected to an input of said modulator comparator and to an input of said sawtooth generator, and the output of said sawtooth generator is connected to said input of said modulator comparator.

7. A proportional speed floating controller as specified in claim 6 including an adjustable slide wire forming a dead band adjustment, and a connection from a tap on said slide wire to the other input of said modulator comparator.

8. A proportional speed floating controller as specified in claim 2 and including a rate amplifier interposed between the output of said deviation amplifier and the input of said modulator whereby said error signal includes a rate component.

9. A proportional speed floating controller as specified in claim 2 including a derivative network and a buffer amplifier constituting a rate amplifier connected between the output of said deviation amplifier and the input of said modulator, an adjustable slide wire connected to said derivative network for adjustment of the rate time, and an adjustable slide wire connected to said buffer amplifier for adjustment of offset of the electronic circuitry.

10. Apparatus comprising a transmitter, a receiver, a two-wire transmission line connecting said receiver to said transmitter, said transmitter being operable to establish a bidirectional time-proportioned direct current in said transmission line, said receiver including first and second light emitting diodes reversely connected in parallel to said transmission line, first and second light sensitive means arranged for activation by an individual one of said first and second light emitting diodes, and control means connected to said light sensitive means and selectively controlled in a first or a second sense depending upon which of said light sensitive means is activated by its associated diode and to an extent depending upon the time-proportioning of said current.

11. Apparatus as specified in claim 10 wherein said transmitter is operative to establish in said transmission line direct current pulses having a duration variable in accordance with the magnitude of intelligence to be transmitted to said receiver, wherein said control means comprises a reversible electrical motor, and wherein said receiver is operative in response to said direct current pulses to control the energization of said motor for rotation in one direction or the other and at a speed in accordance with the direction and duration said of direct current pulses, respectively.

12. A proportional speed floating controller adapted in response to a process-variable signal to produce bidirectional time-proportioned direct current signal pulses comprising, a deviation amplifier responsive to the departure of said process-variable signal from a set point to produce an error signal the magnitude and polarity of which depends upon the extent and direction of departure of said process-variable signal from said set point a triangular wave generator operative to produce a triangular wave signal, a modulator, said modulator including error signal polarity detecting means for producing a first steady signal at a first terminal when said error is of one polarity and to produce a second steady state signal at a second terminal when said error signal is of the opposite polarity, said modulator further including means to compare said triangular wave signal with the absolute value of said error signal for producing at a third terminal a pulse signal the duration of which varies in accordance with the relative magnitudes of said error and triangular wave signals, and an output circuit including means connected to said terminals of said modulator to produce bidirectional direct current pulses in said output circuit, the direction and duration of said pulses varying in accordance with the polarity and amplitude of said error signal.

13. A proportional speed floating controller as specified in claim 12 including means responsive to the magnitude of said error signal for adjusting the frequency of said triangular wave signal.

14. A proportional speed floating controller as specified in claim 12, wherein the triangular wave produced by said generator is a sawtooth wave and wherein means responsive to the magnitude of said error signal are provided for controlling operation of said generator whereby the duration of the rise time of said sawtooth wave is variable in accordance with the magnitude of said error signal, and wherein the fall time of said sawtooth wave is fixed at a predetermined value.

15. A proportional speed floating controller as specified in claim 13, wherein the triangular wave produced by said generator is a sawtooth wave having a rise time portion and a fall time portion and wherein means are provided to establish the time for said fall portion at a predetermined value.

16. A porportional speed floating controller as specified in claim 12 wherein said modulator includes logic circuitry whereby one output pulse only is permitted to occur within each cycle of each said triangular wave signal produced by said triangular wave generator.

17. A proportional speed floating controller as specified in claim 12 wherein said polarity detecting means in said modulator includes a pair of polarity detectors each of which has a negative and a positive input terminal and an output which is adapted to have an active and an inactive state, said error signal being connected to the negative input terminal of one of said polarity detectors and to the positive input terminal of the other of said polarity detectors, the signal at the third terminal of said modulator being connected to the other terminal of each of said detectors, whereby the output of one of said detectors will be in an active state when said error signal is of one polarity and the output of the other of said detectors will be in an active state when said error signal is of the opposite polarity.

18. A proportional speed floating controller as specified in claim 17 including means responsive to the signal at said third terminal of said modulator to clamp in the active state the output of that one of said polarity detectors that is driven to the active state by said error signal whereby one output signal only at said first or second terminals of said modulator is permitted to occur within each cycle of said triangular wave signal produced by said triangular wave generator.

19. A proportional speed floating controller adapted in response to a process-variable signal to produce bidirectional time-proportioned direct current signal pulses comprising, a deviation amplifier responsive to the departure of said process-variable signal from a set point to produce an error signal the magnitude and polarity of which depends upon the extent and direction of departure of said process-variable signal from said set point, and a triangular wave generator operative to produce a triangular wave signal, a modulator operatively arranged to compare said error and triangular wave signals and responsive to the polarity of said error signal to produce a pulse at a first terminal when said error is one polarity and a pulse at a second terminal when said error signal is of the opposite polarity, said modulator producing at a third terminal a signal the duration of which varies in accordance with the relative magnitudes of said error and triangular wave signals, an output circuit including means connected to said terminals of said modulator to produce bidirectional current pulses in said output circuit, the direction and duration of said pulses varying in accordance with the polarity and amplitude of said error signal, said modulator including a pair of polarity detectors each of which has a negative and a positive input terminal and an output which is adapted to have an active and an inactive state, said error signal being connected to the negative input terminal of one of said polarity detectors and to the positive input terminal of the other of said polarity detectors, the signal at the third terminal of said modulator being connected to the other terminal of each of said detectors, whereby the output of one of said detectors will be in an active state when said error signal is of one polarity and the output of the other of said detectors will be in an active state when said error signal is of the opposite polarity, and means defining a dead-band signal, said polarity detectors being further responsive to said dead-band signal whereby the output of either of said polarity detectors will be in an active state only when said error signal exceeds said dead-band signal, and means responsive to the output of said polarity detectors to block the operation of said triangle wave generator whenever said error signal is less than said dead-band signal.

20. The proportional speed floating controller as specified in claim 19 where the triangle wave produced by said generator is a sawtooth wave having a rise time portion and a fall time portion and wherein means are provided to establish the time for said fall time portion at a predetermined value, each of said bidirectional current pulses in said output circuit being of a duration at least equal to the time length of the fall time portion of said sawtooth wave.

* * * * *